Feb. 17, 1970   G. F. GIELOW ET AL   3,495,872
VEHICLE SEAT
Filed Dec. 22, 1967   2 Sheets-Sheet 1
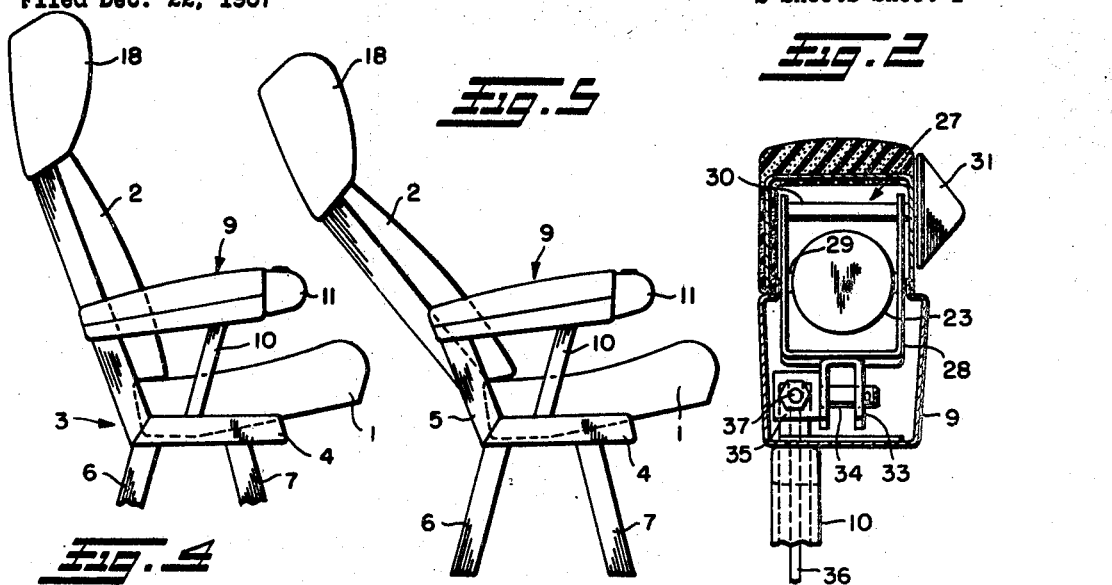
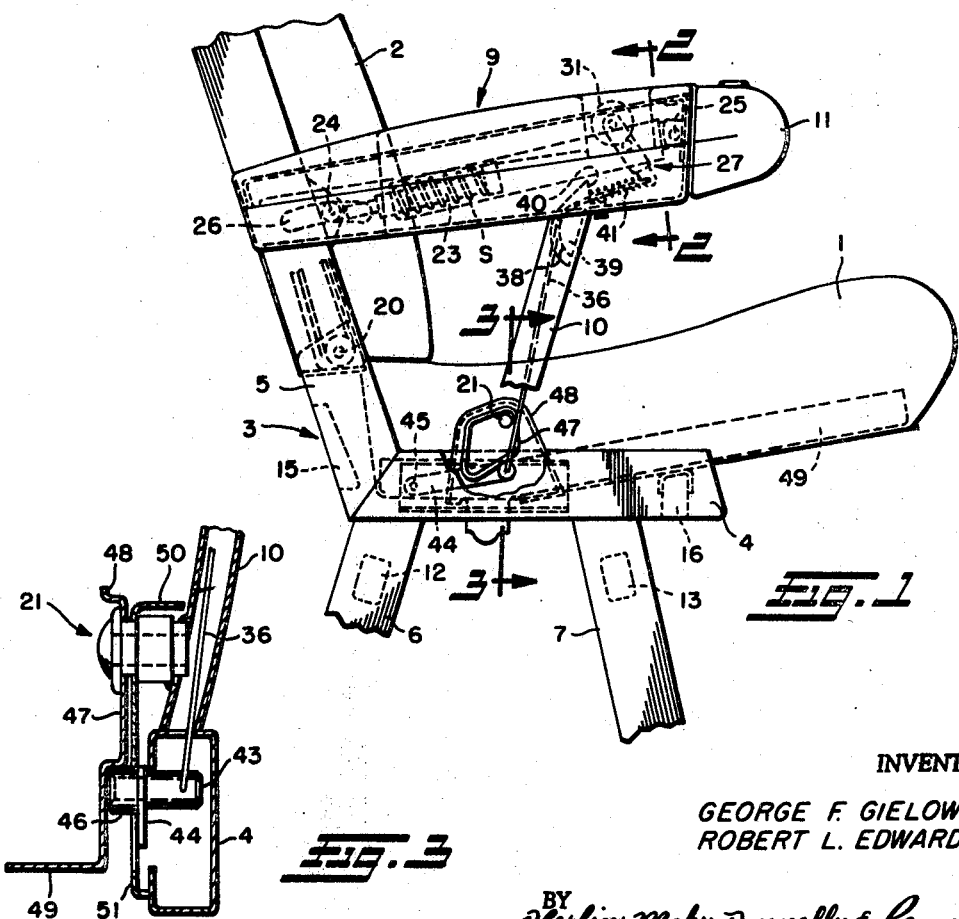
INVENTORS
GEORGE F. GIELOW
ROBERT L. EDWARDS
BY Oberlin, Maky, Donnelly & Renner
ATTORNEYS

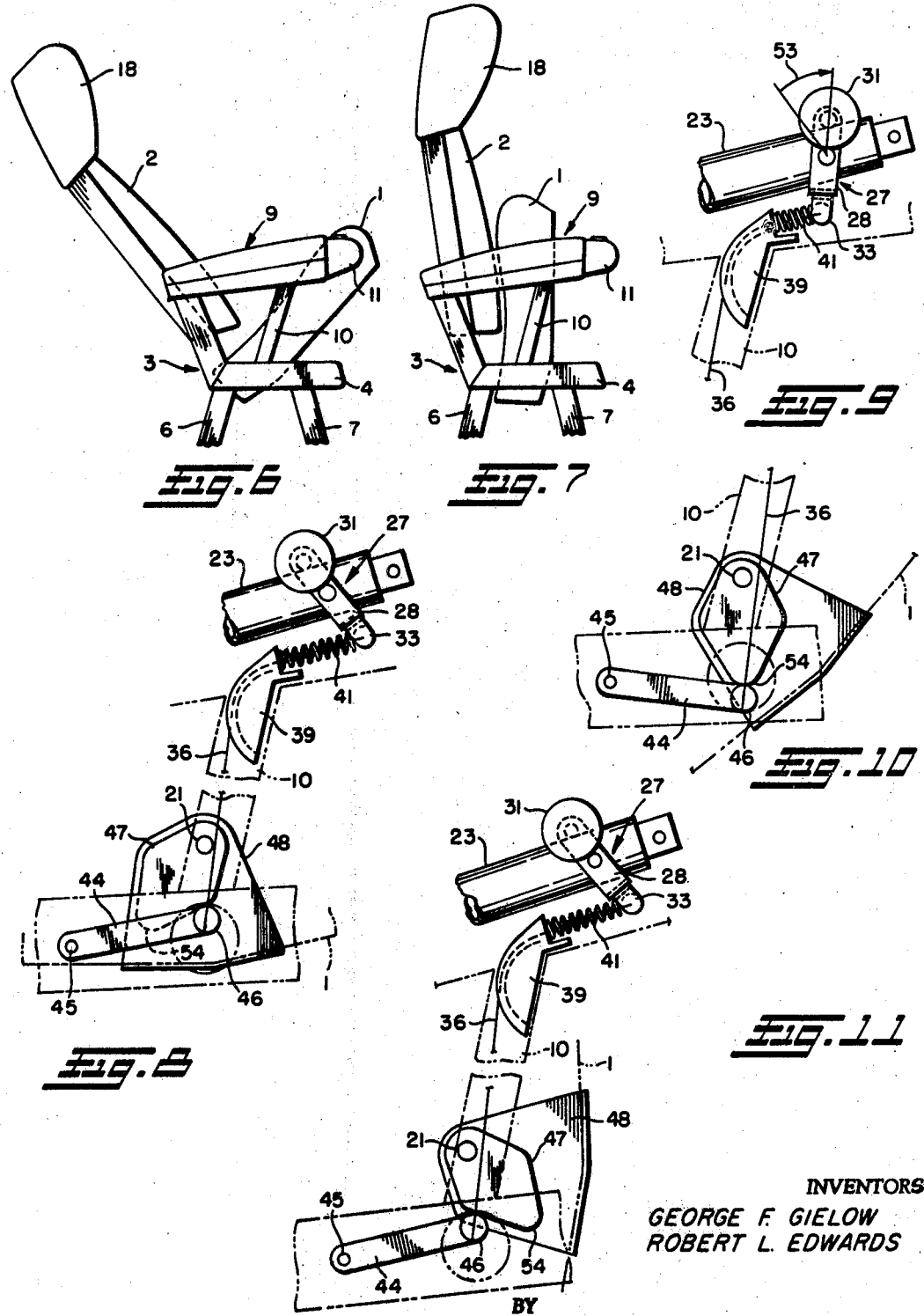

United States Patent Office 3,495,872
Patented Feb. 17, 1970

3,495,872
VEHICLE SEAT
George F. Gielow and Robert L. Edwards, Mansfield, Ohio, assignors to Artnell Company, Chicago, Ill., a corporation of Delaware
Filed Dec. 22, 1967, Ser. No. 692,910
Int. Cl. B60n 1/06; A47c 1/032
U.S. Cl. 297—340                    10 Claims

ABSTRACT OF THE DISCLOSURE

A vehicle seat including pivotally mounted back and seat cushions with a back adjustment recline mechanism mounted in the seat arm, and a cam operated trip release mechanism which automatically raises the seat back to an upright position when the seat cushion is pivoted upwardly by releasing the recline mechanism.

---

This invention relates generally as indicated to a vehicle seat and more particularly to a seat incorporating an interlock between the seat back recline mechanism and the seat cushion such that when the latter is pivoted upwardly, the seat back automatically returns to its upright position and is locked in place.

In vehicles such as buses, airplanes, and the like, the seats are arranged in parallel rows fairly close to each other and may extend three deep from an aisle. Access to a window seat or a seat furthest from the aisle may be quite difficult especially if the seats ahead have the seat backs reclined to any extent. This seat access problem is a particular burden for maintenance personnel when cleaning between and beneath the rows of seats.

The seat access problem can be solved by a seat which can quickly and simply be folded into a compact condition without requiring release of back recline mechanisms which are generally located in a seat arm rest with the mechanism actuator being on the interior of the rest principally accessible to the seat occupant.

It would accordingly be helpful to both seat users and maintenance personnel to have a vehicle seat which can quickly and easily be folded into a compact condition to permit free movement therepast and to provide access between the seat rows.

It is therefore a principal object of the present invention to provide a vehicle seat and the like wherein the back and seat cushion can be folded into an upright compact condition with the back and seat cushion being approximately parallel.

Another principal object is the provision of a vehicle seat wherein the back will automatically shift to an upright condition when the seat cushion is lifted.

Another object is the provision of a vehicle seat having a back recline mechanism in the seat arm which is automatically released when the seat cushion is pivoted to bring the seat back to an upright position.

A further object is the provision of a seat adjustment and trip lock assembly for a vehicle seat wherein the elevation of the seat cushion will release the back to move to its upright position with the back being locked in such upright position when the seat cushion has obtained its position of maximum elevation.

Yet another object is the provision of a vehicle seat having a back release mechanism connected to a pivotally mounted seat cushion by a cam and cable trip mechanism to obtain the noted compact condition upon pivoting of the seat cushion.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a fragmentary side elevation of a seat in accordance with the present invention, parts being broken away for clarity of illustration;

FIG. 2 is an enlarged vertical section taken through the arm rest of the seat as seen from the line 2—2 of FIG. 1;

FIG. 3 is an enlarged fragmentary vertical section taken substantially on the line 3—3 of FIG. 1 illustrating the seat cushion pivot and release mechanism;

FIG. 4 is a reduced side elevation of the vehicle seat with the back in a normal recline position with the seat cushion occupied;

FIG. 5 is a view similar to FIG. 4 showing the position the back may achieve by release of the recline actuator again with the seat cushion occupied;

FIG. 6 is a view similar to FIGS. 4 and 5 illustrating the back reclined with the seat unoccupied and the seat cushion in the process of being pivoted upwardly or elevated;

FIG. 7 is a similar side elevation of the seat showing the empty seat back and cushion folded into the smallest possible package;

FIG. 8 is a broken detail of the recline actuator and release mechanism in the position they would be with the seat in the FIG. 4 or FIG. 5 position with the back locked in an adjusted recline position;

FIG. 9 is a fragmentary detail of the recline actuator in its unlocked condition as moved by the operator or the release mechanism so that the seat back can be adjusted;

FIG. 10 is a fragmentary detail view of the trip release mechanism as it would be in the FIG. 6 position of the seat which, of course, moves the recline actuator to the FIG. 9 position; and FIG. 11 is a view similar to FIG. 8 showing the recline actuator and trip release mechanism in the position of the seat in the FIG. 7 condition.

Referring now to the annexed drawings and more particularly to FIGS. 1 and 5, it will be seen that the seat comprises a seat cushion 1 and a seat back 2 both pivotally mounted on frame 3 which includes a horizontal base frame member 4 and an upwardly inclined back frame member 5, the former being supported by legs 6 and 7. An arm rest 9 extends forwardly of the back from the top of the frame member 5 and is supported above the base frame member 4 by hollow strut 10. The arm rest 9 terminates at its distal end in an ash receiver container 11.

The legs of the seat include transverse frame members extending in a plane normal to FIG. 1 as indicated at 12 and 13 and additional transverse frame members 15 and 16 are included in the frame 3 and connected to frame members similar to 4 and 5 on the opposite side of the seat. The frame member 16 extends beneath the seat cushion 1 and acts as a down stop and support therefor. As seen more clearly in FIG. 5, the seat back 2 includes a head rest 18.

The seat back 2 is pivotally mounted on the frame at 20 while the seat cushion 1 is pivotally mounted at 21. As illustrated, the seat cushion pivot 21 is below and forwardly offset from the back pivot 20 which permits the seat cushion and back to be folded into the small package indicated more particularly in FIG. 7. As seen, the pivot 21 is in line with the strut 10.

A seat recline mechanism 23 is provided in the arm 9 which is connected at one end at 24 to the seat back 2 and at the opposite end to the distal end of the arm 9 at 25. Such recline mechanism is generally conventional with the pivot 25 being fixed at the distal end of the arm while the pivot connection 24 extends laterally through arcuate slot 26 in the arm. The recline mechanism is, of course, spring loaded, as indicated by the spring S, to its retracted position and such mechanism can be released or locked by movement of actuator 27 shown perhaps in greater detail in FIG. 2.

Such actuator includes a U-shape operating member 28 operatively pivoted at 29 to the recline mechanism 23, the legs of which are joined at the upper end by stud 30 which projects through the interior of the arm 9 with conical control knob 31 being provided on the projecting end thereof. The control knob fits within a slight recess 32 on the interior of the arm in a convenient position for the chair occupant.

Secured to the lower end of the operating U-shape lever 28 is a U-shape bracket 33 through which extends pin 34. The pin is provided with a head which includes a vertically extending plate 35 laterally of the bracket 33 to which is secured the upper end of a trip cable or flexible link 36 as indicated at 37. The cable extends through a circular arcuate groove 38 in a cable guide 39 which is mounted as indicated in the upper end of the hollow strut 10. The cable guide includes an abutment 40 and compression spring 41 surrounds the cable between the guide and actuator 27. The compression spring urges the actuator to the position shown in FIG. 1 which is the locked position for the recline mechanism firmly holding the seat back 2 in its selected position. The cable guide may be of suitable nylon or polypropylene material having self-lubricating properties permitting the cable freely to slide over the arcuate groove.

The lower end of the cable 36 is connected to pin 43 which is mounted on the distal end of lever 44 pivoted at 45 to the seat frame member 4. The inner end of the pin 43 projecting through the lever 44 is provided with a nylon or like material roller or cam follower 46 which rides against the periphery of diamond-shape cam 47 which projects laterally from the upstanding ears 48 of the seat cushion base 49. The seat cushion pivot 21 extends through the upstanding portion 50 of reinforcing bracket 51 secured to the inside of the frame member 4 and as seen more clearly in FIG. 3, the seat cushion pivot is also welded to the strut 10.

The configuration of the cam 47 as seen perhaps more clearly in FIGS. 8, 10 and 11 is such that it will pivot the lever 44 about its proximal pivot 45 pulling the cable 36 down as the seat cushion 1 is pivoted thus releasing the recline mechanism actuator 27. Accordingly, as the seat is folded up, the back is automatically released to snap into its uppermost position as seen in FIG. 7 due to the spring pressure of the recline mechanism 23.

OPERATION

Referring now more particularly to FIGS. 4 through 7 as well as FIGS. 8 through 11 and starting with FIG. 4, it will be seen that the seat in the condition there illustrated has the seat back in a normal recline position with the seat occupied. The seat occupant may, of course, adjust the position of the seat back by moving the actuator control knob 31 releasing the recline mechanism. With the recline mechanism released by exerting a backward push, the seat back may be moved to its maximum position of recline as indicated in FIG. 5. By comparing FIGS. 8 and 9, it will be seen that in FIG. 8 the actuator is in the locked position which will hold the seat back 2 at its position of selected adjustment. If the occupant pushes the knob 31 forward to the released position as seen in FIG. 9 through the arc generally indicated at 53 and the spring S of the recline mechanism 23 will tend to draw the seat back forward and the occupant may place the same in the position desired.

In FIG. 8, with the seat occupied as seen in FIGS. 4 and 5, the cam 47 will be in the position shown with the roller 46 on one side of the cam apex 54. If the occupant leaves the seat with the seat back in the maximum recline position as indicated in FIG. 6, the seat may now be folded into its smallest package as seen in FIG. 7 by lifting the front edge of the seat cushion 1 as indicated in FIG. 6. In the FIG. 6 condition of the seat cushion 1, the cam will move to the FIG. 10 position with the apex 54 of the cam pushing the lever 44 down pulling the cable 36 to compress the spring 41 to move the recline mechanism actuator to the release position seen in FIG. 9. As soon as the recline mechanism is released, the seat back will move to its uppermost position seen in FIG. 6 and continued elevation of the seat cushion 1 will move the roller 46 on the opposite side of the apex 54 of the cam 47 permitting the spring 41 to shift the actuator 27 back to its locked position. This guarantees that the seat back will be firmly held in place in the smallest package condition of FIG. 7 and it will be seen that this compact folded arrangement provides more room between the seats to permit passengers or maintenance personnel to pass in and out.

Other modes of applying the principles of the invention may be employed, change being made as regards the details described, provided the features stated in any of the following claims or the equivalent of such employed.

We, therefore, particularly point out and distinctly claim as our invention:

1. A vehicle seat comprising a spring loaded pivotally mounted seat back, a pivotally mounted seat cushion, an arm rest, a seat recline mechanism in said arm rest operative to lock said seat back in a selected reclined position, and means responsive to the pivoting of said seat cushion operative to release said seat back recline mechanism automatically to bring the seat back to an upright position.

2. A vehicle seat as set forth in claim 1 including a recline mechanism actuator in said arm rest having two positions, the first locking the seat against movement, the second permitting movement, said last mentioned means being operative to shift said actuator to said second position during pivotal movement of said seat cushion.

3. A vehicle seat as set forth in claim 2 including a cam mounted on said seat cushion for pivotal movement therewith, and follower means for said cam connected to said actuator operative to shift the latter on movement of the cam with respect to said follower means.

4. A vehicle seat as set forth in claim 3 including a link interconnecting said follower and actuator to move the latter on movement of the former.

5. A vehicle seat as set forth in claim 4 wherein said link comprises a cable, and spring means urging said cable to a taut condition to hold said follower means against said cam.

6. A vehicle seat as set forth in claim 3 wherein said cam is operative to return said actuator to said first position when said seat cushion is folded up against said seat back.

7. A vehicle seat as set forth in claim 2 including a hollow strut supporting said arm rest, and a trip release mechanism interconnecting said seat cushion and said recline mechanism extending through said hollow strut.

8. A vehicle seat as set forth in claim 7 wherein said trip release mechanism includes a cable extending through said strut, and a cable guide at the top of said strut.

9. A vehicle seat as set forth in claim 8 including an actuator for said recline mechanism in said arm, one end of said cable being connected to said actuator, and a compression spring extending between said actuator and said cable guide.

10. A vehicle seat as set forth in claim 7 wherein the pivot of said seat cushion is substantially aligned with said strut and is beneath and forward of the pivot of said seat back.

References Cited

UNITED STATES PATENTS

| | | | |
|---|---|---|---|
| 2,016,119 | 10/1935 | Owler et al. | 297—362 |
| 2,130,781 | 9/1938 | Willoughby | 297—365 |
| 2,283,485 | 5/1942 | Beck | 297—364 |
| 2,336,013 | 12/1943 | Hamilton | 297—367 |
| 2,750,993 | 6/1956 | McGregor | 297—360 |
| 2,799,326 | 7/1957 | Liljengren et al. | 297—364 XR |
| 2,802,216 | 8/1957 | Liljengren | 297—374 |

BOBBY R. GAY, Primary Examiner

G. O. FINCH, Assistant Examiner